United States Patent [19]
Petterec

[11] 3,722,771
[45] Mar. 27, 1973

[54] FILM STRIP PROJECTOR
[75] Inventor: Robert E. Petterec, Lindenhurst, Ill.
[73] Assignee: Bell & Howell Company, Chicago, Ill.
[22] Filed: Nov. 16, 1971
[21] Appl. No.: 199,223

[52] U.S. Cl. ..................226/51, 226/76, 226/117, 352/189
[51] Int. Cl. ..............................B65h 17/04
[58] Field of Search ....226/51, 117, 76, 174; 74/664, 74/665, 84; 352/166, 180, 187, 189, 190

[56] References Cited
UNITED STATES PATENTS
3,586,224  6/1971  Adams..................................226/76

Primary Examiner—Allen N. Knowles
Assistant Examiner—Gene A. Church
Attorney—Kenneth W. Greb et al.

[57] ABSTRACT

A film strip projector having a powered drive means selectively operable to feed the film by an intermittent drive in the forward projection direction and operable to rewind the film by a continuous drive at a rate faster than the intermittent drive.

5 Claims, 5 Drawing Figures

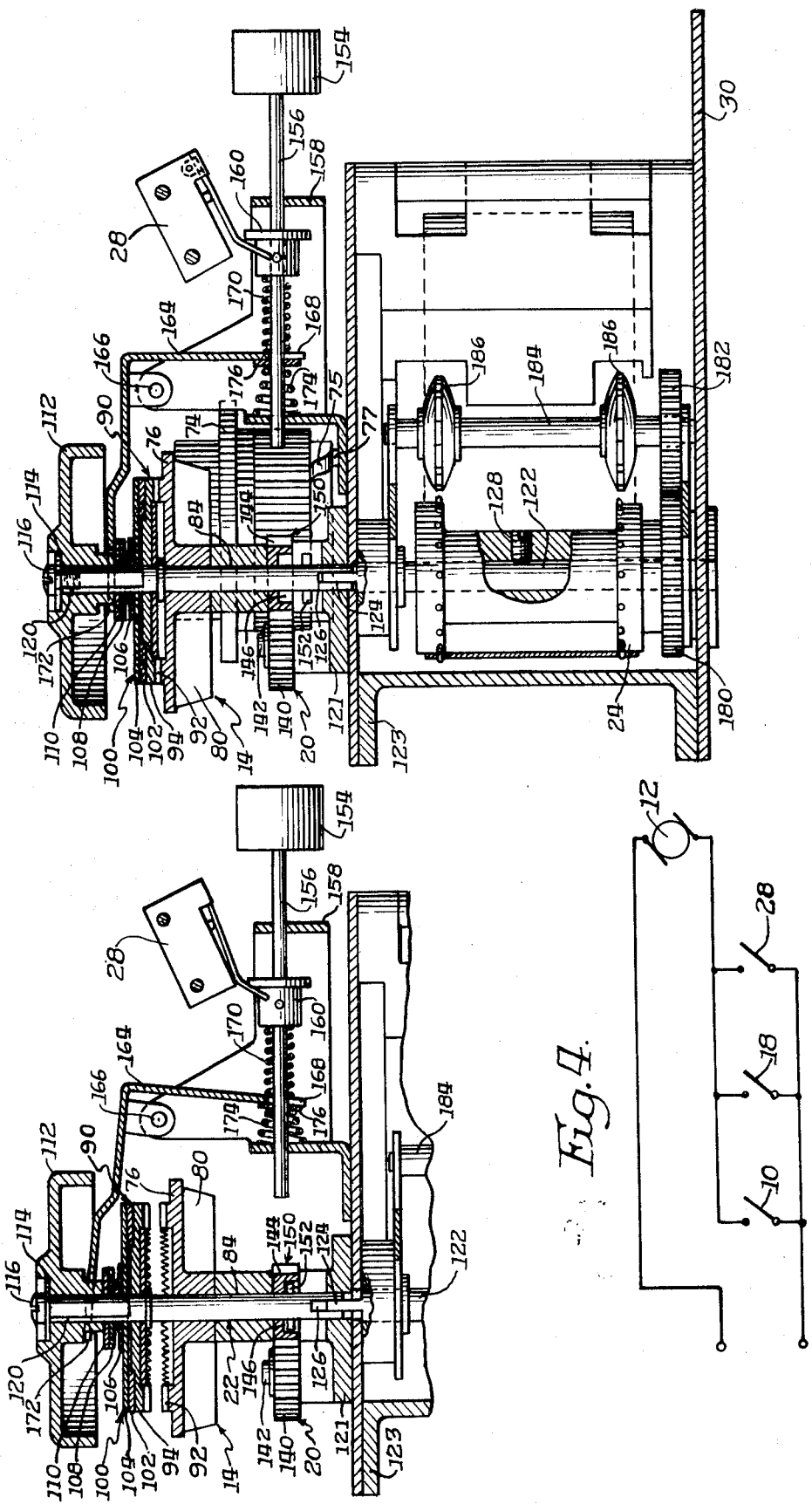

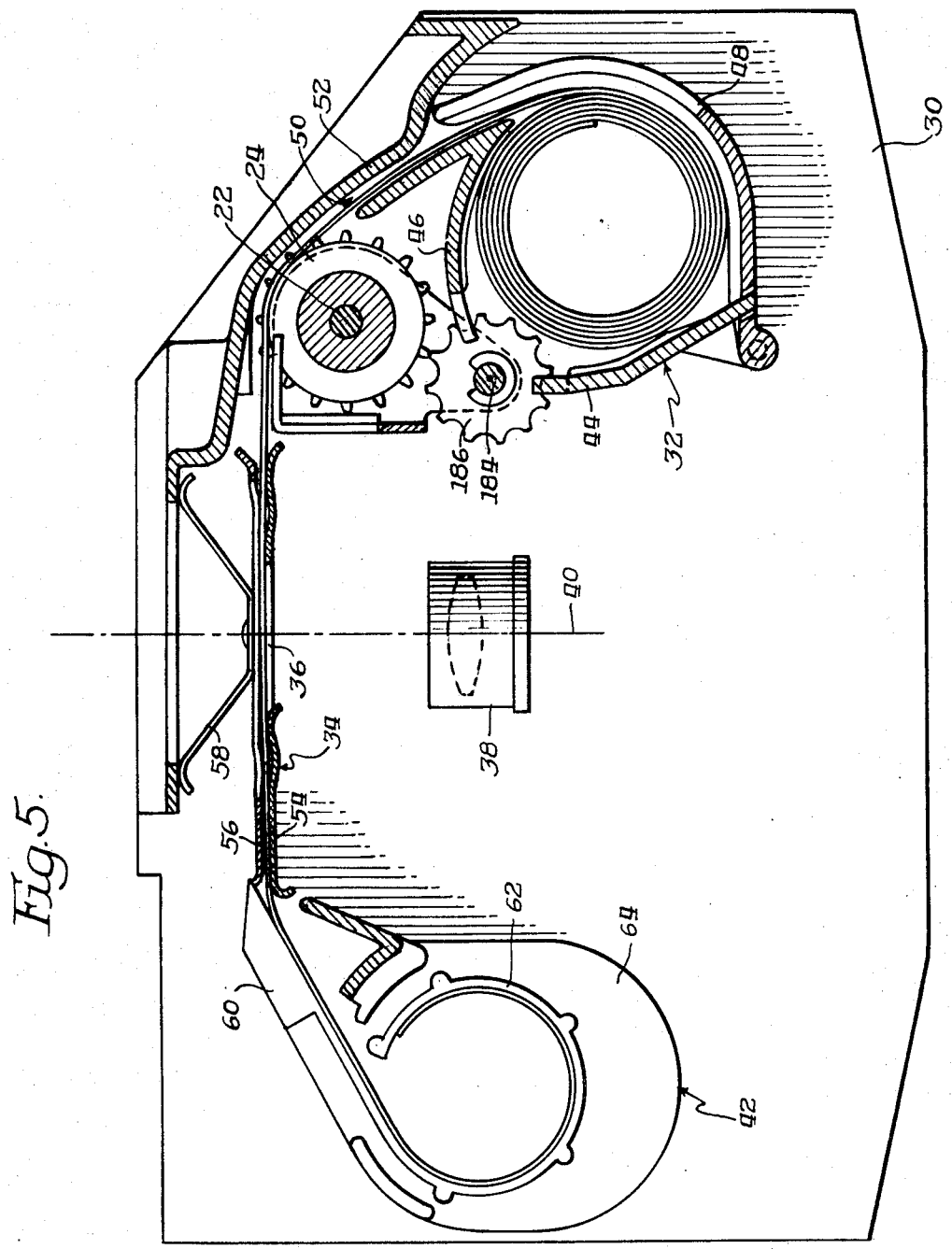

FILM STRIP PROJECTOR

FIELD OF THE INVENTION

The present invention relates to a film strip projector and more particularly to a mechanism selectively operable to feed the film frame by frame in the projection direction and operable to feed the film with a continuous drive in the rewind direction.

BACKGROUND OF THE INVENTION

Known film strip projectors have a powered drive means operable for intermittently feeding the film frame by frame in the normal forward projection direction and operable for rewinding the film. However, the rewind drive is provided by reversing the intermittent drive resulting in an unsatisfactory slow rewind film movement.

SUMMARY OF THE INVENTION

An object of the present invention is to provide a film strip projector with a film sprocket selectively driven by an intermittent drive or by a continuous drive.

Another object of the present invention is to provide a film strip projector with a film sprocket selectively driven by a powered intermittent drive for feeding film frame by frame in the forward projection direction or by a powered continuous drive for rewinding film at a rate faster than the forward intermittent drive.

A further object of the present invention is to provide a film strip projector with a first manual control means for energizing the motor for driving a forward intermittent film drive means and with a second manual control means for energizing the motor for driving a rewind continuous film drive means.

Further and other objects of this invention will be readily understood by those skilled in the art with reference to the following description of the accompanying drawings.

BRIEF DESCRIPTION OF THE DRAWINGS

FIG. 2 is an elevational view showing the film drive mechanism in the intermittent drive condition.

FIG. 3 is an elevational view showing the film drive mechanism in the continuous drive condition.

FIG. 4 is a schematic drawing of the control circuit for the drive mechanism.

FIG. 5 is a sectional end view showing the supply chamber, the sprocket drive, the projection axis, and the take-up chamber.

The basic operation of the film strip projector will be summarized. Referring to FIGS. 1 and 4, a manually operable start switch 10 will energize a unidirectional motor 12. An intermittent drive means 14 is driven by the motor 12 to feed a film 16 in the forward frame-by-frame projection direction. The intermittent drive means 14 includes a cam-controlled switch 18 which de-energizes the motor 12 automatically after each frame of the film has been advanced. A continuous drive means 20 is driven by the motor 12 to feed the film in the rewind direction. An output drive means 22 including a film sprocket 24 is selectively coupled to the intermittent drive means 14 or the continuous drive means 20. A selective means 26 including a rewind switch 28 is manually operated to energize the motor 12 and to uncouple the intermittent drive means 14 while coupling the continuous drive means 20 for connecting the motor 12 to the output drive means 22 for rewinding the film. The motor 12 remains energized as long as the selective means 26 is held actuated during the rewind operation.

Referring to FIG. 5, the film strip projector includes a frame member 30 supporting a film supply chamber 32, the output drive means 22, a film guide construction 34 defining a projection aperture 36, a projection lens 38 aligned with the projection aperture 36 and defining a projection axis 40 and a film take-up chamber 42.

Figure 1:
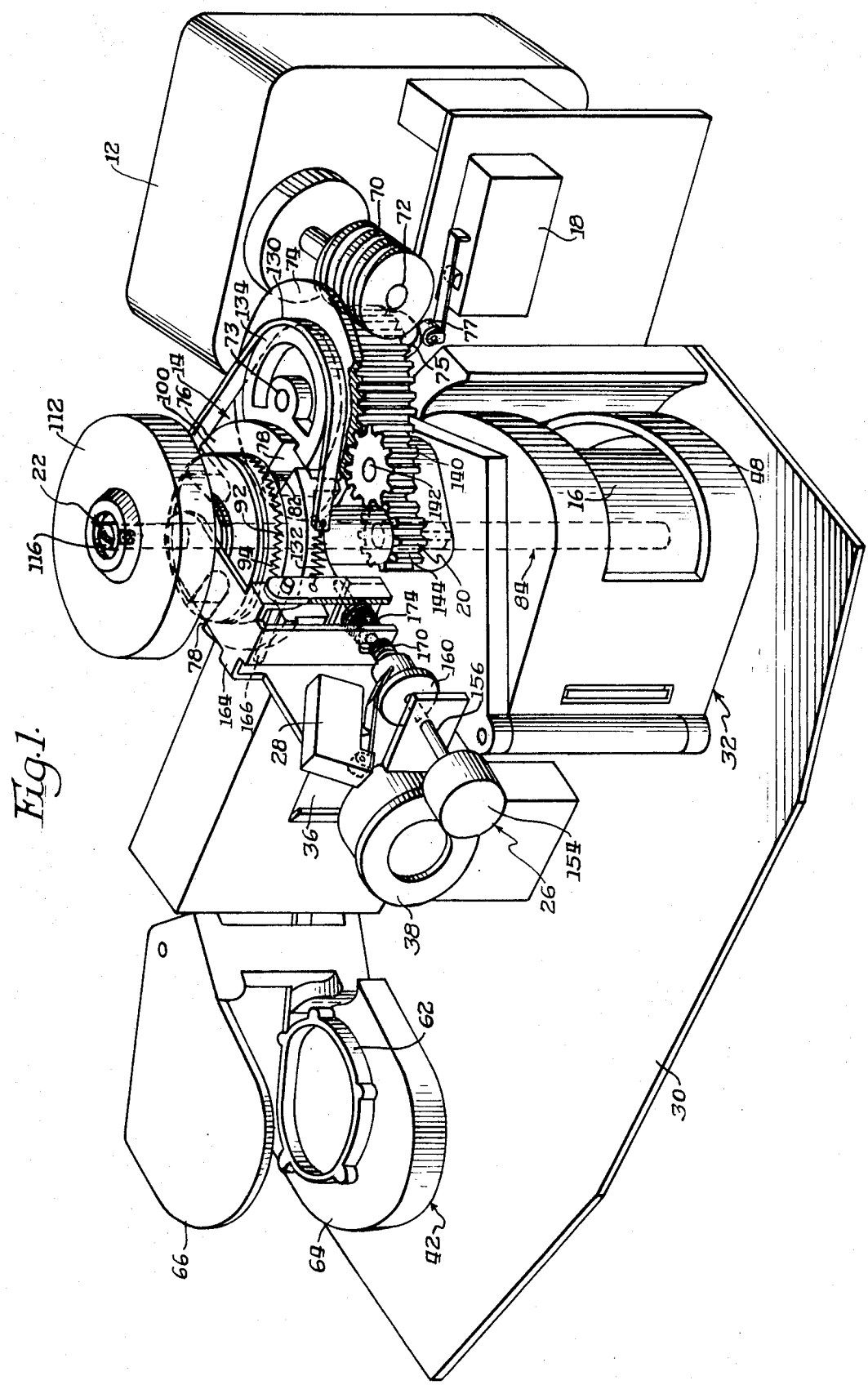
FIG. 1 is a perspective view showing the film strip projector with the film drive mechanism of the present invention.

The film supply chamber 32 includes a housing having rigid sections 44 and 46 and a hinged cover 48. A film passageway 50 for guiding the film to the film sprocket 24 is formed by one of the rigid sections 46, the hinged cover 48 and a guide 52 supported on the frame member 30. The film guide construction 34 has a first plate 54 guiding one side of the film rigidly supported on the frame member 30. A second plate 56 guiding the other side of the film is supported for movement parallel with the projection axis 40 and biased against the film by a leaf spring 58. The first plate 54 and the second plate 56 form the projection aperture. The film take-up chamber 42 includes a film retainer 60 extending from the film guide construction 34 to form a circle by a flexible end portion 62 for rolling the film therein. The take-up chamber 42 also includes a pair of end walls 64 and 66 supported on the frame member 30 for guiding the edges of the film.

SINGLE-FRAME DRIVE

Referring now to FIGS. 1, 2 and 4, to advance the film a single frame, the start switch 10 (FIG. 4) is actuated manually or is actuated by any suitable means such as an electrical signal from a magnetic tape. The motor 12 is energized thereby rotating a worm gear 70 rigidly attached to the motor shaft 72. The intermittent drive means 14 is a conventional geneva drive. The geneva drive 14 includes a main gear 74 which is in mesh with the worm gear 70. The main gear 74 is rotatably supported on a shaft 73. A cam 75 is formed on the underside of the main gear 74. The switch 18 has a cam follower 77 operable to keep the motor 12 energized while riding on a high portion of the cam 75 relative to the main gear 74 and operable to de-energize the motor 12 while riding on a low portion of the cam 75. The geneva drive 14 also includes a star member 76 having four driving recesses 78 spaced about its axis and has four dwell recesses 80 positioned between the driving recesses 78. A pin 82 carried by the main gear 74 enters one of the driving recesses 78 of the star member 76 and advances the star member 76 one-fourth of a revolution. The star member 76 is supported on an output shaft 84 of the output drive means 22 for rotation relative thereto.

A positive-toothed clutch 90 couples the geneva drive 14 to the output shaft 84. A first member 92 of the toothed clutch 90 is formed integral with the star member 76 of the geneva drive. A second member 94 of the toothed clutch 90 is rotatably mounted on the output shaft 84 and in alignment to engage the first member 92.

A friction clutch 100 is located between the positive-toothed clutch 90 and the output shaft 84 to synchronize the geneva drive 14 with the film frame aligned with the projection aperture 36. The friction clutch 100 includes a cork disc 102 positioned against the second toothed member 94 of the positive-toothed clutch 90. A metallic disc 104 is biased against the cork disc 102 by a spring washer 106. The metallic disc 104 has a flat portion aligned with a flat portion on the output shaft 84 to connect the metallic disc 104 with the output shaft 84 for rotation therewith. A first flat washer 108 is positioned against the spring washer 106. A second flat washer 110 is positioned against the first flat washer 108. A manually operated knob 112 is rigidly attached to the output shaft 84 by a washer 114 and a screw 116 threaded axially into the output shaft 84.

A framing adjustment is accomplished by rotating the knob 112 in either direction which rotates the metallic disc 104 relative to the second member 94 of the positive-toothed clutch 90. The output shaft 84 through the film sprocket 24 moves the film for aligning a frame with the projection aperture 36.

The output shaft 84 consists of two sections. The first section 120 supports the star member 76 of the intermittent drive means 14, the positive-toothed clutch 90, the friction clutch 100 and the manually operable knob 112. A bracket 121 assembled to a frame 123 supports the first section 120 in alignment with the second section 122. The second section 122 supports the film sprocket 24. The second section 122 has a projection 124 at one end thereof. The first section 120 has a recess 126 at one end thereof receiving the projection 124 of the second section 122. The first section 120 may be moved axially relative to the second section 122 while maintaining a rotational drive therebetween. The film sprocket 24 is rigidly assembled to the second section 122 of the output shaft 84 by a set screw 128. The film sprocket 24 engages the film perforations for moving the film.

A single-frame drive is accomplished by actuating the manually operated start switch 10 which energizes the motor 12. The start switch 10 is then released. The motor 12 drives the main gear 74 of the geneva-type intermittent drive 14. The main gear 74 advances the high part of the cam 75 to close the cam switch 18 which holds the motor 12 energized. The pin 82 carried by the main gear 74 enters one of the recesses 78 in the star member 76 and advances the star member 76 one-fourth of a revolution. The star member 76 rotates the positive-toothed clutch 90 and the friction clutch 100 thereby rotating the output shaft 84. The output shaft 84 rotates the film sprocket 24 for moving the film relative to the projection aperture 36.

The cam switch 18 holds the motor 12 energized until a film frame has advanced to an aligned position with the projection aperture 36. The cam 75 has rotated to a position causing the cam switch 18 to de-energize the motor 12. A brake member 130 is biased against the main gear 74 by a spring 132 for stopping the motion of the inertia actuated drive. During the stopping motion of the drive, a circular rib 134 extending from the main gear 74 enters one of the dwell recesses 80 in the star member 76 to prevent rotation of the star member 76 while the main gear 74 comes to rest. The single frame drive may be selectively repeated merely by operating the manually actuated start switch 10.

CONTINUOUS DRIVE

Referring now to FIGS. 3 and 4, the continuous drive means 20 for rewinding the film from the take-up chamber 42 to the supply chamber 32 will now be described. An intermediate gear 140 is rotatably supported on a shaft 142 and positioned to be continuously in mesh with the main gear 74. A pinion gear 144 is supported on the first section 120 of the output shaft 84 for rotation relative thereto and is continuously in mesh with the intermediate gear 140. A positive pin clutch 150 is selectively operable to couple the main gear 74 to the output shaft 84 for rotating the output shaft 84 at a continuous rate, at a faster rate and in a reverse direction relative to the projection direction. The positive pin clutch 150 includes a pin 152 rigidly attached to the first section 120 of the output shaft 84. The pinion gear 144 has a slot 146 for receiving the pin 152 thereby coupling the pinion gear 144 with the output shaft 84.

To actuate the continuous drive means 20 for rewind, a rewind button 154 rigidly mounted on a shaft 156 is pushed axially inward. The shaft 156 is supported on a bracket 158. A collar 160 rigidly mounted on the shaft 156 is moved to close the rewind switch 28 which energizes the motor 12. An actuator 164 is pivotally supported on a shaft 166. The actuator 164 has a first fork shaped end 168 extending over the shaft 156. A compression spring 170 surrounds the shaft 156 and is positioned between the collar 160 and the forked end 168 of the actuator 164. The actuator 164 has a second fork-shaped end 172 extending over the output shaft 84 and positioned under the knob 112. The movement of shaft 156 causes the compression spring 170 to pivot the actuator 164 clockwise about the shaft 166. The second fork-shaped end 172 of the actuator 164 engages the knob 112 and moves the first section 120 of the output shaft 54 axially outwardly. The movement of the first section 120 carries the pin 152 of the positive pin clutch 150 into engagement with the pinion gear 144 thereby positively coupling the pinion gear 144 with the output shaft 84. The axial shifting of the first section 120 of the output shaft 84 causes a washer 172 to move the second member 94 of the positive-toothed clutch 90 away from the first member 92 thereby uncoupling the positive-toothed clutch 90 from the output shaft 84. The continuous drive then operates from the motor 12, through the main gear 74, the intermediate gear 140, the pinion gear 144, and the output shaft 84 to drive the film sprocket 24 in reverse direction at a continuous rate thereby moving the film from the take-up chamber 42 to the supply chamber 32.

The continuous drive means can be readily adapted to feed the film in the forward projection direction at a continuous rate merely by omitting the intermittent gear 140 and directly coupling the main gear 94 with the pinion gear 144.

The rewind drive may be stopped at any time by releasing the rewind button 154 to provide a partial or complete film return for convenient repeated projection. A second compression spring 174 surrounds the shaft 156 and is positioned between a washer 176 which is positioned against the forked end 168 of the actuator 164 and the bracket 158. The second compression spring 174 drives the shaft 156 outwardly. This movement of the shaft 156 causes the collar 160 to move away from the rewind switch 28 thereby opening the switch 28 and de-energizing the motor 12. This movement of the shaft 156 also causes the actuator 164 to pivot counterclockwise about its shaft 166 causing the second end 172 of the actuator 164 to drive the first section 120 of the output shaft 84 axially inwardly. This movement of the output shaft 84 disengages the positive pin clutch 150 by moving the pin 152 out of the slot 146 in the pinion gear 144 and engages the positive-toothed clutch 90 by moving the second member 94 in engagement with the first member 92. The single frame drive means is now in condition for operation.

PROJECTOR LOADING

Referring to FIGS. 2 and 5, when initially inserting a supply of film for projection into the supply chamber 32, it is necessary to advance the lead end of the film to the film sprocket 24. This is accomplished by repeated actuations of the single frame drive means. The single frame drive means rotates the second section 122 of the output shaft 84. Also rigidly connected to the second section 122 of the output shaft 84 is a gear 180 for rotation therewith. A second gear 182 is rigidly attached to a shaft 184 and is in mesh with the output shaft gear 180. A pair of toothed members 186 is rigidly mounted on the shaft 184 and spaced apart to engage the edges of the film. The pair of toothed members 186 are formed from rubber to minimize damaging the film. Other suitable elastomeric material could be selected. The rotation of the output shaft 84 causes the toothed members 186 to rotate in the opposite direction than that of the film sprocket 24 by the mating gears 180 and 182. When a normal full supply of film is inserted in the supply chamber 32, the toothed members 186 will engage the edges of the film and drive the lead end of the film through the film passageway 50 and to the film sprocket 24. Continuous actuation of the single frame drive means causes the film sprocket 24 to advance the film to the projection aperture 36. The pair of toothed members 186 continue to operate but become ineffective when the diameter of film is small enough to be spaced from the toothed members 186.

What is claimed is:

1. A film strip projector having a projection aperture comprising:
  input drive means;
  output drive means feeding film past said projection aperture;
  intermittent drive means coupling said input drive means to said output drive means;
  said output drive means including an output shaft and a film engaging sprocket driven by said output shaft, said output shaft being selectively driven by said intermittent drive means and said continuous drive means,
  continuous drive means coupling said input drive means to said output drive means, said continuous drive means driving said output shaft and said film in a reverse direction and at a faster rate relative to said intermittent drive means; and
  said intermittent drive means includes a first clutch for coupling said input drive means to said output drive means, said continuous drive means includes a second clutch for coupling said input drive means to said output drive means and said control means operable to disable one of said clutches and enable the other of said clutches.

2. A film strip projector having a projection aperture comprising:
  input drive means;
  output drive means feeding film past said projection aperture;
  intermittent drive means coupling said input drive means to said output drive means;
  continuous drive means coupling said input drive means to said output drive means; and control means simultaneously and alternately enabling and disabling said intermittent drive means and said continuous drive means, said output drive means includes an output shaft selectively driven by said intermittent drive means and said continuous drive means, said intermittent drive means includes a first clutch having a first clutch member secured to said output shaft, said continuous drive means includes a second clutch having a second clutch member secured to said output shaft, both said clutches being enabled and disabled simultaneously by axial movement of said output shaft, and said control means operable to move said output shaft axially.

3. A film strip projector as defined in claim 2 further comprising biasing means urging said output shaft axially in one direction.

4. A film strip projector as defined in claim 3 wherein said control means includes a manually operable member for over-riding said biasing means.

5. A film strip projector having a projection aperture comprising:
  a unidirectional motor;
  a film sprocket for feeding film past said projection aperture;
  a shaft having a first section and a second section, said second section supporting said film sprocket for rotation therewith;
  a geneva intermittent drive means driven by said motor for advancing film in a frame-by-frame sequence;
  a first clutch supported on said first section of said shaft coupling said geneva intermittent drive means to said shaft;
  a continuous drive means driven by said motor for re-winding film at a rate faster than said geneva intermittent drive means;
  a second clutch supported on said first section of said shaft for coupling said continuous drive means to said shaft; and
  a manually operable actuator for moving said first section axially relative to said second section of said shaft for opening said first clutch and closing said second clutch.

* * * * *